United States Patent
Lim et al.

(10) Patent No.: US 12,469,908 B2
(45) Date of Patent: Nov. 11, 2025

(54) BUTTON-TYPE SECONDARY BATTERY

(71) Applicant: LG ENERGY SOLUTION, LTD., Seoul (KR)

(72) Inventors: Jae Won Lim, Daejeon (KR); Yong Gon Lee, Daejeon (KR); Je Jun Lee, Daejeon (KR); Geon Woo Min, Daejeon (KR); Min Su Cho, Daejeon (KR); Min Gyu Kim, Daejeon (KR); Hak Kyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 678 days.

(21) Appl. No.: 17/791,783

(22) PCT Filed: Sep. 16, 2021

(86) PCT No.: PCT/KR2021/012724
§ 371 (c)(1),
(2) Date: Jul. 8, 2022

(87) PCT Pub. No.: WO2022/065809
PCT Pub. Date: Mar. 31, 2022

(65) Prior Publication Data
US 2023/0033605 A1 Feb. 2, 2023

(30) Foreign Application Priority Data
Sep. 23, 2020 (KR) .......... 10-2020-0123362

(51) Int. Cl.
*H01M 50/153* (2021.01)
*H01M 50/109* (2021.01)
(Continued)

(52) U.S. Cl.
CPC ....... *H01M 50/153* (2021.01); *H01M 50/109* (2021.01); *H01M 50/184* (2021.01); *H01M 50/538* (2021.01)

(58) Field of Classification Search
CPC ............. H01M 50/153; H01M 50/109; H01M 50/184; H01M 50/538; H01M 50/186;
(Continued)

(56) References Cited

U.S. PATENT DOCUMENTS 7,742,280 B2 6/2010 Sato et al.
11,121,394 B1 9/2021 Chang et al.
(Continued)

FOREIGN PATENT DOCUMENTS

CN 102694202 B 7/2014
CN 208208832 U 12/2018
(Continued)

OTHER PUBLICATIONS

English translation of CN-111370618-A (Year: 2020).*
(Continued)

*Primary Examiner* — Ula C Ruddock
*Assistant Examiner* — Sarika Gupta
(74) *Attorney, Agent, or Firm* — Morgan, Lewis & Bockius LLP

(57) ABSTRACT

A button-type secondary battery includes an electrode assembly; a lower can having an accommodation space in which the electrode assembly is accommodated; an upper can coupled to the lower can to cover the accommodation space; a gasket sealing a gap between the lower can and the upper can and to electrically insulate the lower can from the upper can while being inserted into a coupled portion of the lower can and the upper can; and a first electrode tab including a first coupling part coupled to a first electrode of the electrode assembly and a second coupling part coupled
(Continued)

between the gasket, which is disposed at the coupled portion of the lower can and the upper can, and the upper can. The second coupling part is coupled between the gasket and the upper can by a pressure generated when the lower and upper cans are coupled to each other.

14 Claims, 8 Drawing Sheets

(51) Int. Cl.
  *H01M 50/184*  (2021.01)
  *H01M 50/538*  (2021.01)
(58) Field of Classification Search
  CPC ............... H01M 50/531; H01M 10/04; H01M 10/0431; H01M 50/10; H01M 50/166; H01M 10/0427; H01M 50/147; H01M 50/183; H01M 50/56; Y02E 60/10; Y02P 70/50
  See application file for complete search history.

(56) References Cited

U.S. PATENT DOCUMENTS

| | | |
|---|---|---|
| 2012/0100406 A1 | 4/2012 | Gaugler |
| 2017/0187008 A1 | 6/2017 | Gaugler |
| 2018/0013101 A1 | 1/2018 | Gaugler |
| 2018/0097215 A1 | 4/2018 | Cho et al. |
| 2020/0099018 A1 | 3/2020 | Gaugler |
| 2020/0194736 A1 | 6/2020 | Gaugler |
| 2020/0212373 A1 | 7/2020 | Gaugler |
| 2020/0212374 A1 | 7/2020 | Gaugler |
| 2021/0184298 A1 | 6/2021 | Gaugler |
| 2021/0265686 A1 | 8/2021 | Gaugler |
| 2021/0399369 A1 | 12/2021 | Gaugler |
| 2021/0399370 A1 | 12/2021 | Gaugler |

FOREIGN PATENT DOCUMENTS

| | | | | |
|---|---|---|---|---|
| CN | 109860498 A | | 6/2019 | |
| CN | 209016108 U | | 6/2019 | |
| CN | 210379130 U | | 4/2020 | |
| CN | 210379131 U | * | 4/2020 | |
| CN | 111180616 A | | 5/2020 | |
| CN | 210778837 U | | 6/2020 | |
| CN | 111370618 A | * | 7/2020 | ........ H01M 10/0427 |
| CN | 111540847 A | | 8/2020 | |
| CN | 211265524 U | | 8/2020 | |
| JP | 2010-267466 A | | 11/2010 | |
| JP | 2014-049371 A | | 3/2014 | |
| KR | 10-2002-0088469 A | | 11/2002 | |
| KR | 10-2012-0036970 A | | 4/2012 | |
| KR | 10-2018-0036086 A | | 4/2018 | |
| KR | 10-2018-0137118 A | | 12/2018 | |
| KR | 10-2020-0007559 A | | 1/2020 | |
| KR | 10-2020-0007560 A | | 1/2020 | |
| KR | 10-2020-0007562 A | | 1/2020 | |

OTHER PUBLICATIONS

English translation of CN-210379131-U (Year: 2020).*
Extended European Search Report issued Apr. 3, 2024 for European Patent Application No. 21872837.6.
International Search Report (with partial translation) and Written Opinion dated Dec. 28, 2021, for corresponding International Patent Application No. PCT/KR2021/012724.
Office Action issued in Chinese patent application 202180008121.9 dated Aug. 31, 2023.

* cited by examiner

BUTTON-TYPE SECONDARY BATTERY

CROSS-REFERENCE TO RELATED APPLICATION

The present application claims the benefit of the priority of Korean Patent Application No. 10-2020-0123362, filed on Sep. 23, 2020, which is hereby incorporated by reference in its entirety.

TECHNICAL FIELD

The present invention relates to a button-type secondary battery capable of coupling an electrode tab to an upper can without welding.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like.

The secondary battery comprises a button-type secondary battery having a high energy density, a high output, and a long lifespan. The button-type secondary battery comprises an electrode assembly, a lower can accommodating the electrode assembly, an upper can coupled to the lower can, and a gasket sealing a gap between the lower can and the upper can.

The electrode assembly comprises a first electrode tab and a second electrode tab. Here, the first electrode tab is connected to the upper can, and the second electrode tab is connected to the lower can.

However, in the button-type secondary battery according to the related art, since the first electrode tab and the upper can are coupled to each other in a welding manner using a laser, a welding device has to be separately provided, and in particular, a process is complicated due to an additional welding process.

DISCLOSURE OF THE INVENTION

Technical Problem

The present invention is invented to solve the above problems, and an object of the present invention is to provide a button-type secondary battery comprising a first electrode tab connecting a first electrode of an electrode assembly to an upper can, wherein the first electrode tab is provided at a coupled portion of a lower can and the upper can and fixed by coupling force between the lower can and the upper can to connect the first electrode tab to the upper can without welding, thereby simplifying the process because the welding process is omitted.

Technical Solution

A button-type secondary battery according to the present invention for achieving the above object comprises: an electrode assembly; a lower can having an accommodation space, in which the electrode assembly is accommodated; an upper can coupled to the lower can to finish the accommodation space; a gasket configured to seal a gap between the lower can and the upper can and insulate the lower can from the upper can while being inserted into a coupled portion of the lower can and the upper can; and a first electrode tab provided with a first-a coupling part coupled to a first electrode of the electrode assembly and a first-b coupling part coupled between the gasket, which is disposed at the coupled portion of the lower can and the upper can, and the upper can, wherein the first-b coupling part is coupled between the gasket and the upper can by a pressure generated when the lower can and the upper can are coupled to each other.

The lower can may comprise a bottom surface, on which the electrode assembly is disposed, and a wall surface formed along an edge of the bottom surface to form an accommodation space, the upper can comprises a cover surface configured to finish the accommodation space and a coupling surface formed along an edge of the cover surface and coupled to the wall surface, the gasket comprises an outer surface provided between the wall surface and the coupling surface, an inner surface provided inside the wall surface, and a connection surface provided between the wall surface and the cover surface to connect the outer surface to the inner surface, and the first-b coupling part is coupled between the connection surface and the cover surface.

The first electrode tab may further comprise a first-c coupling part coupled between the coupling surface and the outer surface while extending from the first-b coupling part, wherein the first-c coupling part may be coupled between the coupling surface and the outer surface by a pressure generated when the wall surface and the coupling surface are coupled to each other.

The first electrode tab may further comprise an extension part provided between the first-a coupling part and the first-b coupling part to extend along a surface of the electrode assembly, and a first-d coupling part provided between the extension part and the first-b coupling part and bent to be in surface close contact with the inner surface disposed on the wall surface.

An insulator having insulation may be provided between the extension part and the surface of the electrode assembly.

An insulating tape may be attached to the first-a coupling part corresponding to the wall surface.

The button-type secondary battery may further comprise a second electrode tab configured to connect a second electrode to the lower can.

The second electrode tab may comprise a second-a coupling part coupled to the second electrode of the electrode assembly and a second-b coupling part coupled between the gasket, which is disposed at the coupled portion of the lower can the upper can, and the lower can, wherein the second-b coupling part may be coupled between the gasket and the lower can by the pressure generated when the lower can and the upper can are coupled to each other.

The second electrode tab may further comprise a second-c coupling part coupled between the wall surface and the outer surface while extending from the second-b coupling part, wherein the second-c coupling part may be coupled between the wall surface and the outer surface by a pressure generated when the wall surface and the coupling surface are coupled to each other.

The second electrode tab may further comprise a second-d coupling part provided between the second-a coupling part and the second-b coupling part and provided between the wall surface and the inner surface.

A button-type secondary battery according to the present invention comprises: an electrode assembly; a lower can having an accommodation space, in which the electrode assembly is accommodated; an upper can coupled to the lower can to finish the accommodation space; a gasket configured to seal a gap between the lower can and the upper can and insulate the lower can from the upper can while being inserted into a coupled portion of the lower can and the upper can; and a second electrode tab provided with a second-a coupling part coupled to a second electrode of the electrode assembly and a second-b coupling part coupled between the gasket, which is disposed at the coupled portion of the lower can and the upper can, and the lower can, wherein the first-b coupling part is coupled between the gasket and the lower can by a pressure generated when the lower can and the upper can are coupled to each other.

The button-type secondary battery may further comprise a first electrode tab configured to connect a first electrode of the electrode assembly to the upper can, wherein the first electrode tab may comprise a first-a coupling part coupled to the first electrode of the electrode assembly and a first-b coupling part coupled between the gasket, which is disposed at the coupled portion of the lower can the upper can, and the upper can, wherein the first-b coupling part may be coupled between the gasket and the upper can by the pressure generated when the lower can and the upper can are coupled to each other.

Advantageous Effects

The button-type secondary battery of the present invention may comprise the electrode assembly, the lower can, the upper can, the gasket, and the first electrode tab connecting the first electrode of the electrode assembly to the upper can, wherein the first-b coupling part of the first electrode tab may be provided between the gasket, which is disposed at the coupled portion of the lower can and the upper can, and the upper can to fix the first electrode tab by the pressure generated when the lower can and the upper can are coupled to each other without the welding, thereby simplifying the process.

MODE FOR CARRYING OUT THE INVENTION

Figure 1:
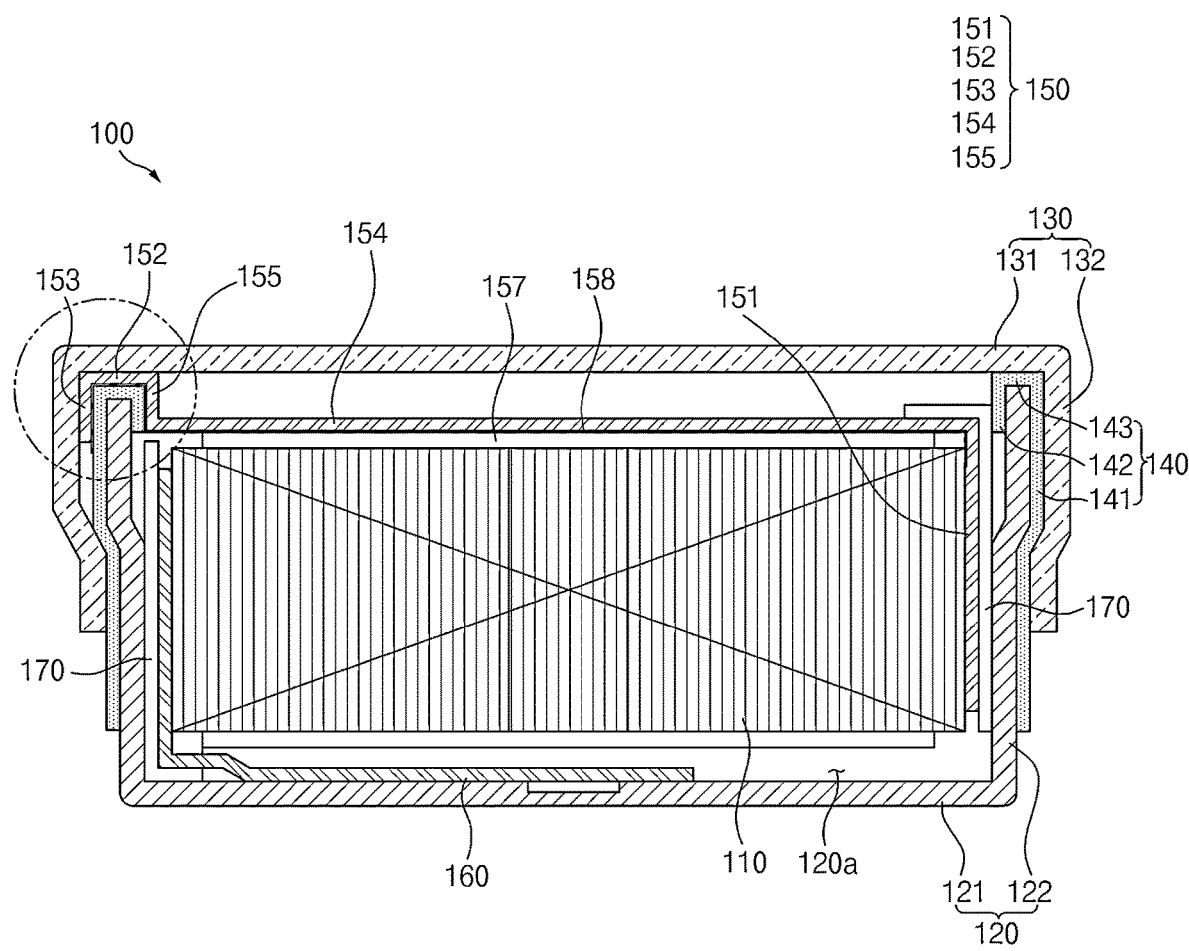
FIG. 1 is a cross-sectional view of a button-type secondary battery according to a first embodiment of the present invention.
Figure 2:
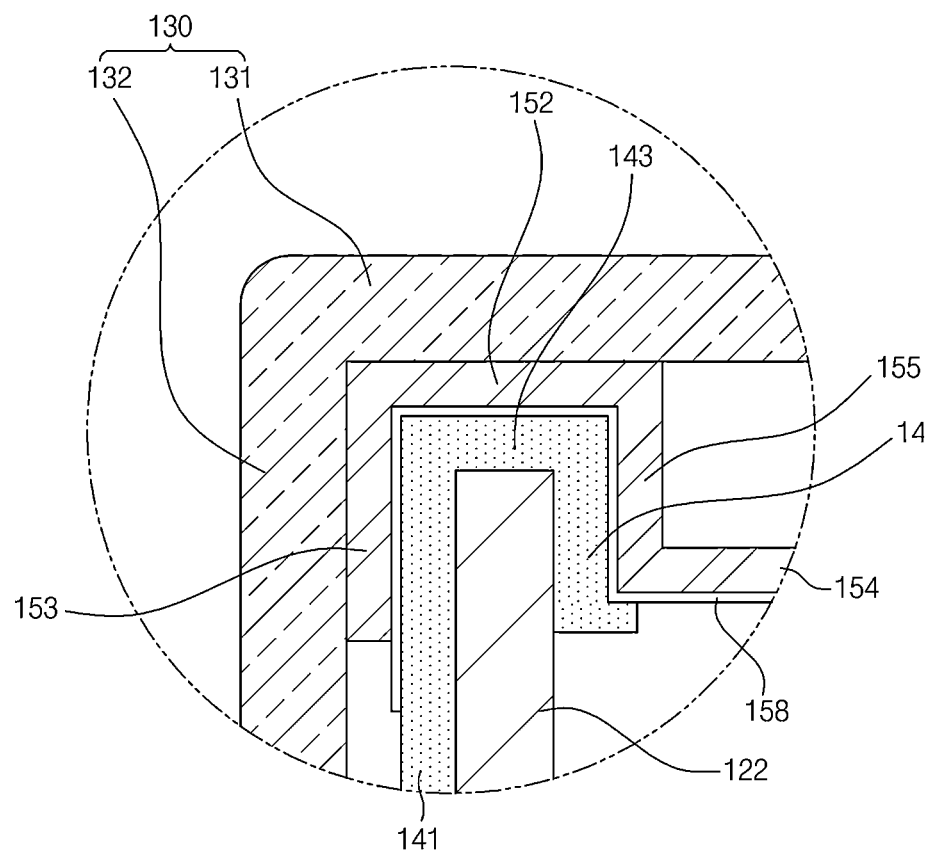
FIG. 2 is a partial enlarged view of FIG. 1.
Figure 3:
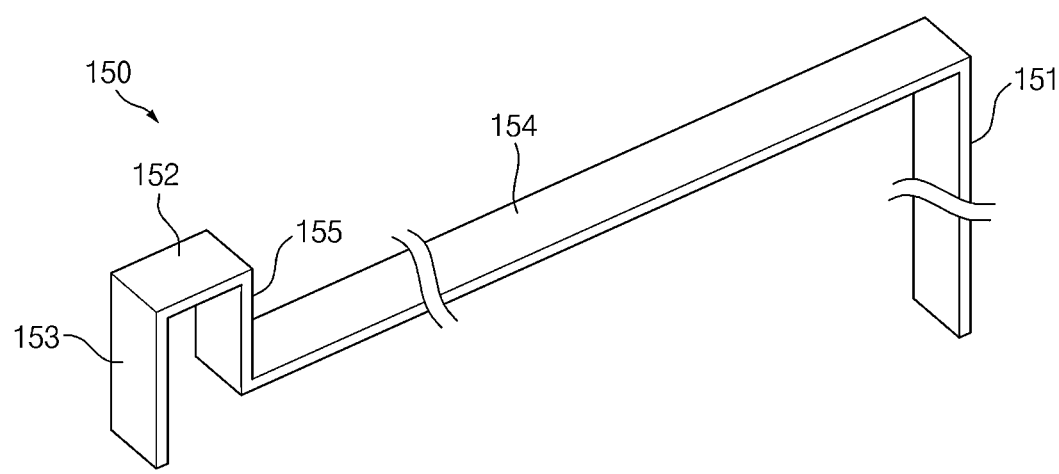
FIG. 3 is a perspective view illustrating a first electrode tab of the button-type secondary battery according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Button-Type Secondary Battery According to First Embodiment of the Present Invention]

As illustrated in FIGS. 1 to 4, a button-type secondary battery 100 according to a first embodiment of the present invention comprises an electrode assembly 110, a lower can 120 having an accommodation space, in which the electrode assembly 110 is accommodated, an upper can 130 coupled to the lower can 120 to finish the accommodation space, a gasket 140 sealing a gap between the lower can 120 and the upper can 130 and insulating the lower can 120 from the upper can 130, a first electrode tab 150 connecting a first electrode of the electrode assembly 110 to the upper can 130, and a second electrode tab 160 connecting a second electrode of the electrode assembly 110 to the lower can 120.

Electrode Assembly

The electrode assembly 110 has a structure in which a first electrode and a second electrode are alternately stacked with a separator therebetween. In addition, an end of the first electrode and an end of the second electrode are respectively disposed at the outermost side of the electrode assembly 110. A first electrode tab 150 is connected to the end of the first electrode, and a second electrode tab 160 is connected to the end of the second electrode.

The first electrode is a positive electrode, and the second electrode is a negative electrode. Thus, the first electrode tab 150 is a positive electrode tab, and the second electrode tab 160 is a negative electrode tab.

Lower Can

The lower can 120 has an accommodation space, in which the electrode assembly is accommodated, and comprises a bottom surface 121 on which the electrode assembly is disposed and a wall surface 122 formed along an edge of the bottom surface 121 to form the accommodation space 120a. A second electrode tab 160 connected to the second electrode of the electrode assembly 110 is coupled to the bottom surface 121.

Upper Can

The upper can 130 is configured to finish the accommodation space, and when viewed in FIG. 1, comprises a cover surface 131 disposed an upper portion of the lower can 120 to finish the accommodation space 120a and a coupling surface 132 formed along an edge of the cover surface 131 and coupled to the wall surface 122.

Gasket

The gasket 140 has a structure, in which the gasket 140 is inserted into a coupled portion of the upper can 120 and the upper can 130 to seal a gap between the lower can 120 and the upper can 130 and insulate the lower can 120 and the upper can 130 from each other.

That is, the gasket 140 comprises an outer surface 141 provided between the wall surface of the lower can 120 and the coupling surface of the upper can 130, an inner surface 143 supported on an inner circumferential surface of the lower can 120, and a connection surface 143 connecting the outer surface 141 to the inner surface 142.

First Electrode Tab

The first electrode tab 150 connects the first electrode of the electrode assembly 110 to the upper can, and in particular has a structure connected to the upper can without welding.

That is, the first electrode tab 150 comprises a first-a coupling part 151 coupled to the first electrode of the electrode assembly 110 and a first-b coupling part 152 coupled between the gasket 140, which is disposed at the coupled portion of the lower can 120 and the upper can 130, and the upper can 130.

Here, the first-b coupling part 152 is coupled between a connection surface of the gasket 140 and a cover surface 131 of the upper can 130 by a pressure generated when the lower can 120 and the upper can 130 are coupled to each other.

That is, when the lower can 120 and the upper can 130 are coupled to each other, the first-b coupling part 152 inserted between the lower can 120 and the upper can 130 is pressed and fixed. Here, the first-b coupling part 152 and the upper can 130 are in contact with each other and connected to each other, and the first-b coupling part 152 and the lower can 120 are insulated from each other by the gasket 140.

Thus, the first-b coupling part 152 of the first electrode tab 150 may be coupled between the lower can 120 and the upper can 130 without welding, and as a result, the welding process may be removed to simplify the process and equipment.

An unevenness may be formed on each of both surfaces of the first-b coupling part 152, and frictional force between the first-b coupling part 152 and the upper can 130 and between the first-b coupling part 152 and the gasket 152 may increase, as a result, coupling force of the first-b coupling part inserted between the lower can 120 and the upper can 130 may increase.

The first electrode tab 150 further comprises a first-c coupling part 153 extending from the first-b coupling part 152 and coupled between the first coupling surface 132 and the outer surface 141. That is, the first-c coupling part 153 extends downward from an end of the first-b coupling part 152 when viewed in FIG. 1 and is coupled between the coupling surface 132 and the outer surface 141. Thus, the first electrode tab 150 may further comprise the first-c coupling part 153 coupled between the coupling surface 132 and the outer surface 141 to increase in coupling force of the first electrode tab 150, and particularly, may have a structure in which the first-c coupling part 153 is hooked between the coupling surface 132 and the outer surface 141 to increase in fixing force of the first electrode tab 150.

The first electrode tab 150 further comprises an extension part 154 provided between the first-a coupling part 151 and the first-b coupling part 152 to extend along a surface (a top surface of the electrode assembly when viewed in FIG. 1) of the electrode assembly 110. That is, the extension part 154 connects the first-a coupling part 151 to the first-b coupling part 152 in a state of being spaced a predetermined distance (approximately 2 mm to 3 mm) from the top surface of the electrode assembly 110 when viewed in FIG. 1. Thus, it is possible to minimize reduction of an inner space of the lower can 120 by the first electrode tab 150.

The first electrode tab 150 further comprises a first-d coupling part 155 provided between the extension part 154 and the first-b coupling part 152 and bent to be in surface close contact with the inner surface 142 disposed on the wall surface 122. That is, the first-d coupling part 155 connects the extension part 154 and the first-b coupling part 152 while being vertically provided along the inner surface 142 when viewed in FIG. 1. Thus, it is possible to minimize reduction of an inner space of the lower can 120 by the first electrode tab 150.

In the present application, when the extension part 154 and the first-d coupling part 155 are provided to be deformed in a longitudinal direction or a thickness direction of the button-type secondary battery, a bent portion between the extension part 154 and the first-d coupling part 155 may be unfolded to be flat and then extend to prevent the first electrode tab from being disconnected. That is, the first electrode tab may secure a margin rate (that is, an extra length) that is capable of increasing in length through the extension part 154 and the first-d coupling part 155 to prevent the first electrode tab from being disconnected.

An insulator 157 having insulation is provided between the extension part 154 and the surface of the electrode assembly 110. That is, the insulator 157 prevents the extension part 154 of the first electrode tab 150 and the second electrode of the electrode assembly 110 from being in contact with each other to previously prevent short circuit from occurring.

Here, the insulator 157 may be attached to a bottom surface of the extension part 154 to increase in fixing force of the insulator 157, and thus, the contact between the extension part 154 of the first electrode tab 150 and the second electrode of the electrode assembly 110 may be effectively blocked.

A cover tape 158 for protecting the gasket 140 may be attached to a surface of the first electrode tab 150 supported by the gasket 140, and also, the cover tape 158 may prevent the gasket 140 from being damaged by the first electrode tab 150 when the lower can 120 and the upper can 130 are coupled to each other. Here, the cover tape 158 is attached to be connected up to surfaces of the first-c coupling part 153, the first-b coupling part 152, and the first-d coupling part 155, a bottom surface of the extension part 154, and an upper end of the first-a coupling part 151 toward the gasket. The cover tape 158 is made of a material having the insulation.

An insulating tape 170 is attached to the first-a coupling part 151 corresponding to the wall surface 122. That is, the insulating tape 170 prevents the short circuit from occurring due to the contact between the first-a coupling part 151 and the wall surface 122 of the lower can 120.

Figure 4:
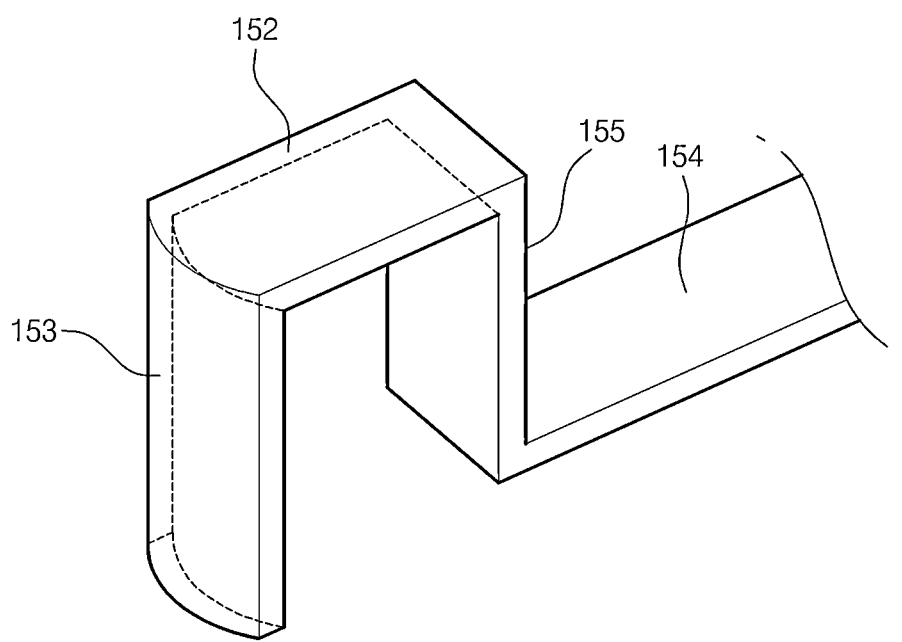
FIG. 4 is a perspective view illustrating another example of a first-c coupling part provided in a first electrode tab.

As illustrated in FIG. 4, the first-c coupling part 153 of the first electrode tab 150 may be formed to have a curved surface having the same curvature as the coupling surface 132 of the upper can 130. That is, when the first-c coupling part 153 is formed as a flat plane, a gap may occur between the first-c coupling part 153 and the coupling surface 132, and thus, adhesion and sealing force between the lower can 120 and the upper can 130 may be weakened. In order to prevent this phenomenon, the first-c coupling part 153 may be formed as the curved surface having the same curvature as the coupling surface 132, and thus, the first-c coupling part 153 and the coupling surface 132 may be in surface close contact with each other. As a result, since there is no gap between the first-c coupling part 153 and the coupling surface 132, it is possible to stably seal the gap between the lower can 120 and the upper can 130.

Therefore, in the button-type secondary battery 100 according to the first embodiment of the present invention, the upper can 130 and the first electrode tab 150 may be coupled to each other without the welding, and thus, the simplification of the process and equipment may be improved.

Hereinafter, in descriptions of another embodiment of the present invention, constituents having the same function as the above-mentioned embodiment have been given the same reference numeral in the drawings, and thus duplicated description will be omitted.

[Button-Type Secondary Battery According to Second Embodiment of the Present Invention]

Figure 5:
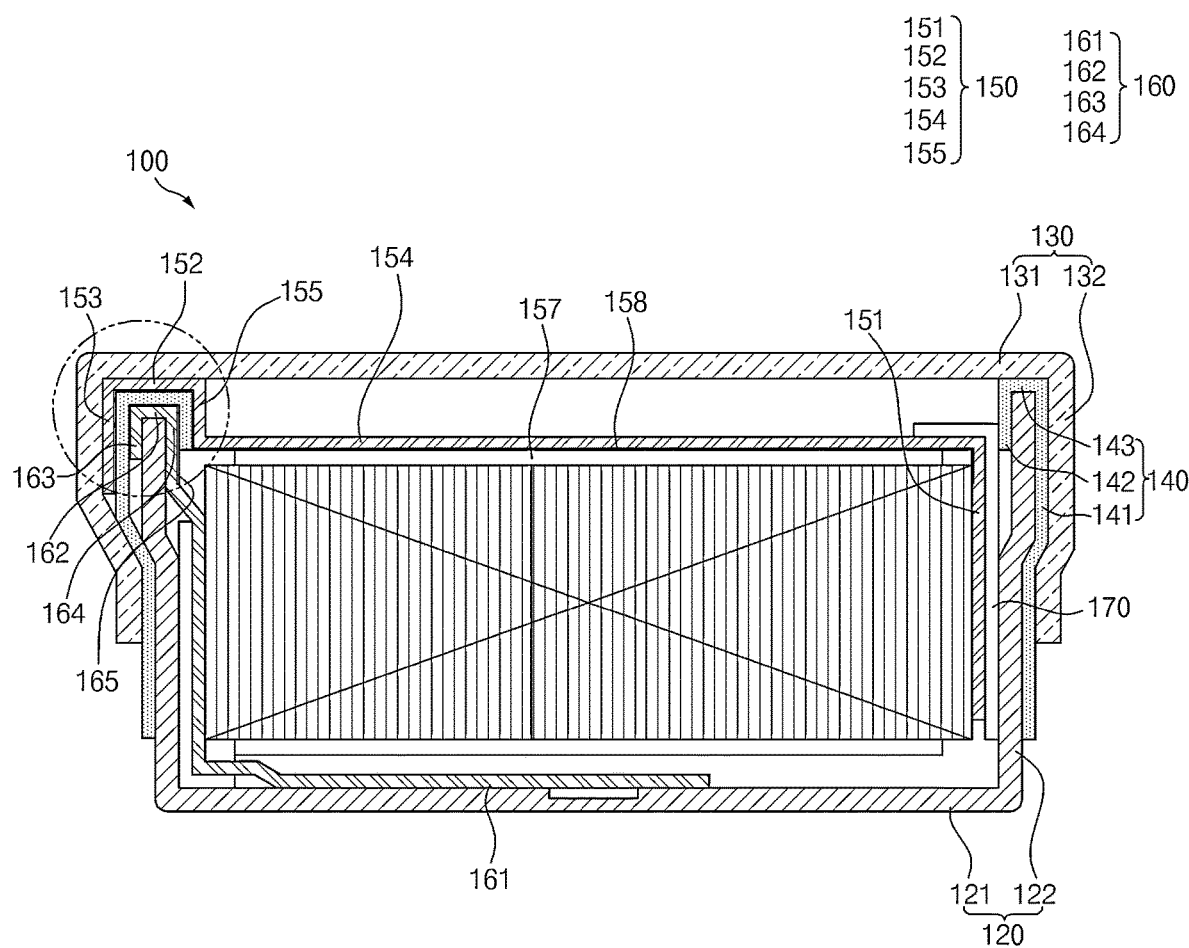
FIG. 5 is a cross-sectional view of a button-type secondary battery according to a second embodiment of the present invention.
Figure 6:
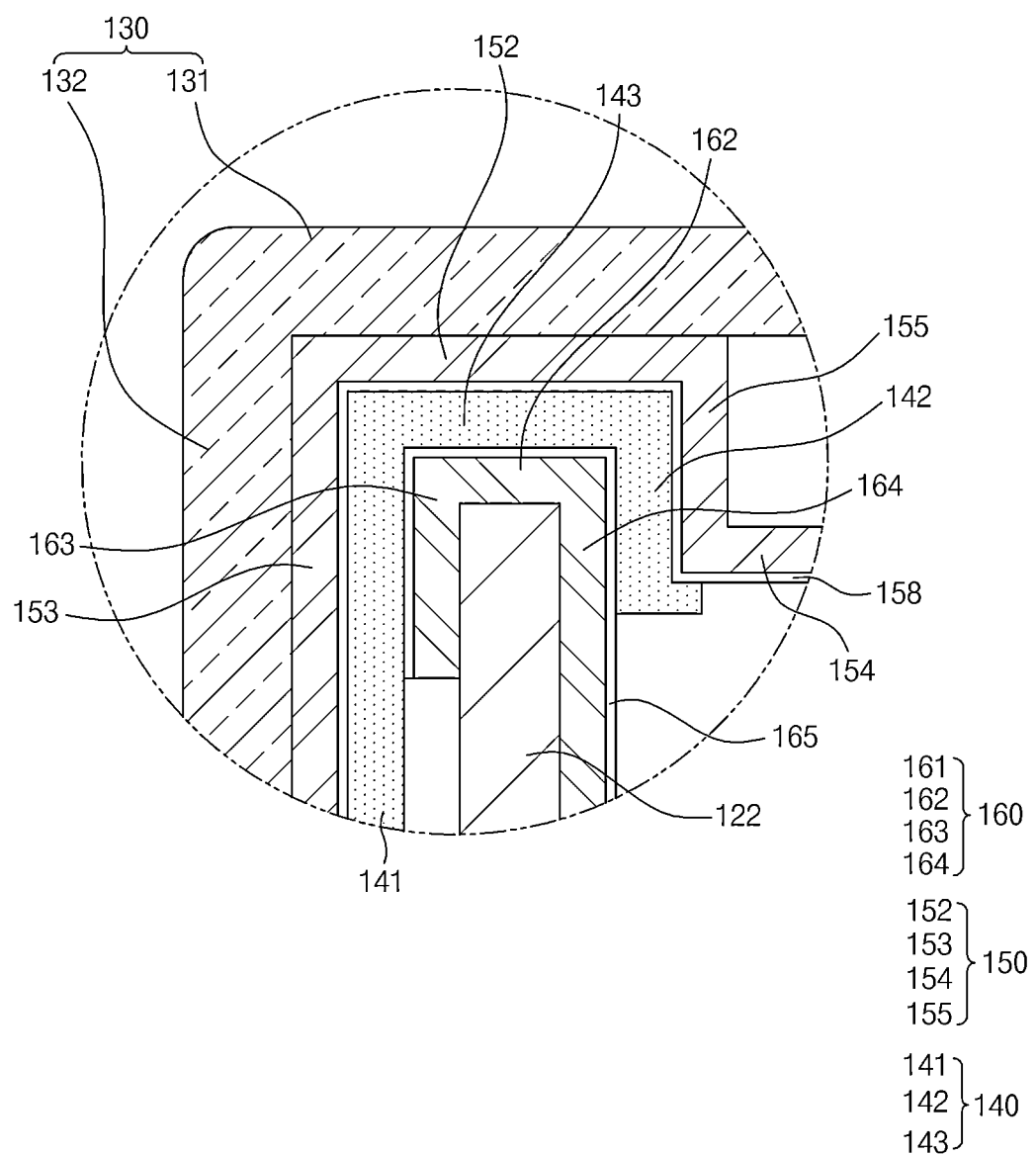
FIG. 6 is a partial enlarged view of FIG. 5.

As illustrated in FIGS. 5 and 6, a secondary battery 100 according to a second embodiment of the present invention comprises an electrode assembly 110, a lower can 120, an upper can 130, a gasket 140, a first electrode tab 150, and a second electrode tab 160.

Here, the electrode assembly 110, the lower can 120, the upper can 130, the gasket 140, and the first electrode tab 150 have the same configuration and function as the electrode assembly, the lower can, the upper can, the gasket, and the first electrode tab, which are described in the first embodiment, and thus, their duplicated description will be omitted.

Second Electrode Tab

The second electrode tab 160 connects a second electrode of the electrode assembly 110 to the lower can 120. Particularly, the second electrode tab 160 is connected to the lower can 120 without welding.

That is, the second electrode tab 160 comprises a second-a coupling part 161 coupled to a second electrode of the electrode assembly 110 and a second-b coupling part 162 coupled between the gasket 140, which is disposed at the coupled portion of the lower can 120 and the upper can 130, and the lower can 120.

Here, the second-b coupling part 162 is coupled between the gasket 140 and the lower can 120 by a pressure generated when the lower can 120 and the upper can 130 are coupled to each other.

That is, when the lower can 120 and the upper can 130 are coupled to each other, the second-b coupling part 162 inserted between the lower can 120 and the upper can 130 is pressed and fixed. Here, the second-b coupling part 162 and the lower can 120 are in contact with each other and connected to each other, and the second-b coupling part 162 and the upper can 130 are insulated from each other by the gasket 140.

Thus, in the second electrode tab 160, the second-b coupling part 162 may be coupled between the gasket 140 and the lower can 120 by the coupling force between the lower can 120 and the upper can 130. As a result, the second electrode tab 160 and the lower can 120 may be coupled to each other without welding.

The second electrode tab 160 further comprises a second-c coupling part 163 extending from the second-b coupling part 162 and coupled between a wall surface 122 and an outer surface 141. That is, the second-c coupling part 163 is fixed between the wall surface 122 and the outer surface 141 of the gasket 140 by a pressure generated when the lower can 120 and the upper can 130 are coupled to each other. Thus, the coupling force of the second electrode tab 160 may increase, and as a result, the second electrode tab may be stably connected to the lower can.

The second electrode tab 160 further comprises a second-d coupling part 164 provided between the second-a coupling part 161 and the second-b coupling part 162 and provided between the wall surface 122 and an inner surface 142 of the gasket 140. That is, an adhesion area and bonding force between the second electrode tab and the lower can may increase through the second-d coupling part 164.

A cover tape 165 for protecting the gasket 140 may be attached to a surface of the second electrode tab 160 supported by the gasket 140, and also, the cover tape 165 may prevent the gasket 140 from being damaged by the second electrode tab 160 when the lower can 120 and the upper can 130 are coupled to each other. That is, the cover tape 165 is attached to be connected up to surfaces of the second-c coupling part 163, the second-b coupling part 162, and the second-d coupling part 164 toward the gasket. The cover tape 165 is made of a material having the insulation.

Therefore, in the button-type secondary battery 100 according to the second embodiment of the present invention, the second electrode tab and the lower can may be coupled to each other without the welding to simplify the process and equipment.

[Button-Type Secondary Battery According to Third Embodiment of the Present Invention]

Figure 7:
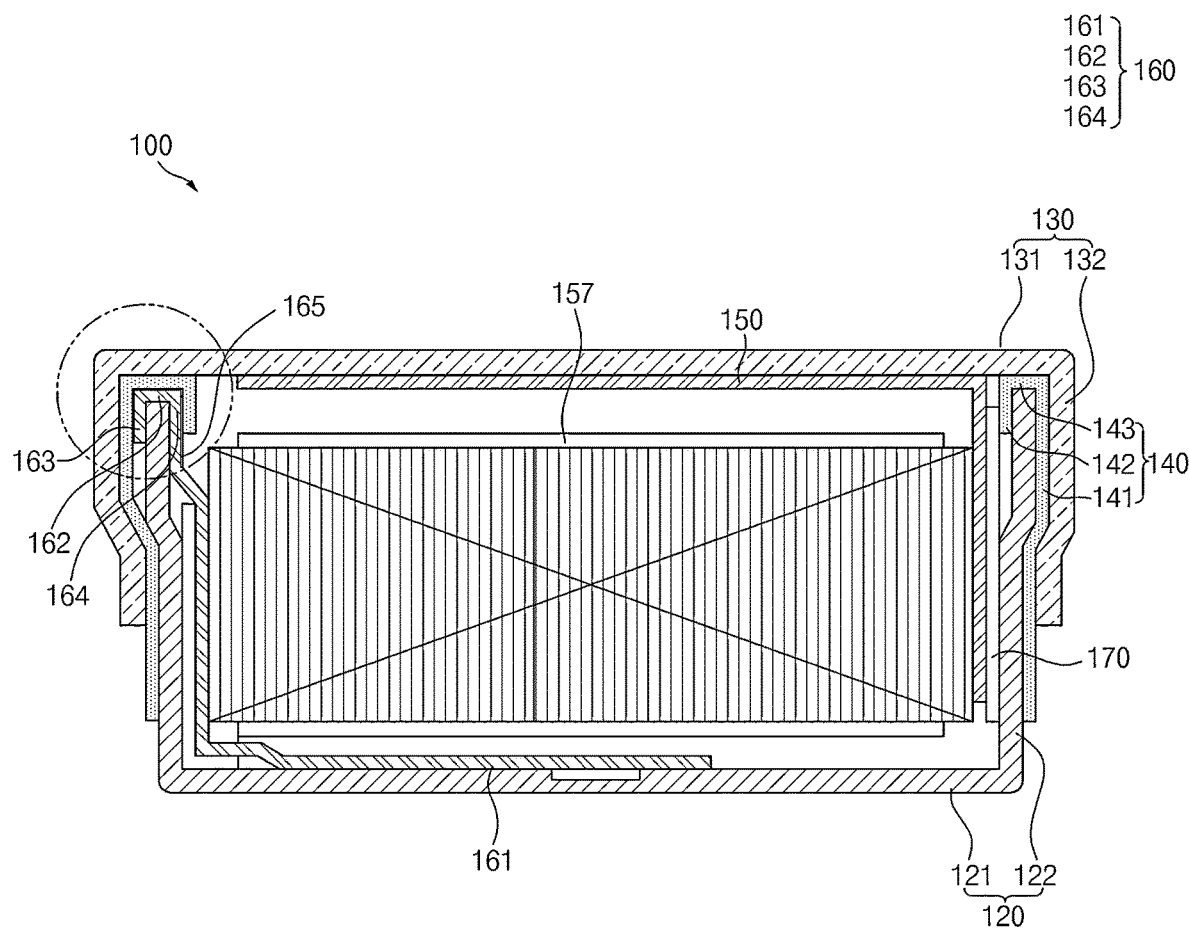
FIG. 7 is a cross-sectional view of a button-type secondary battery according to a third embodiment of the present invention.
Figure 8:
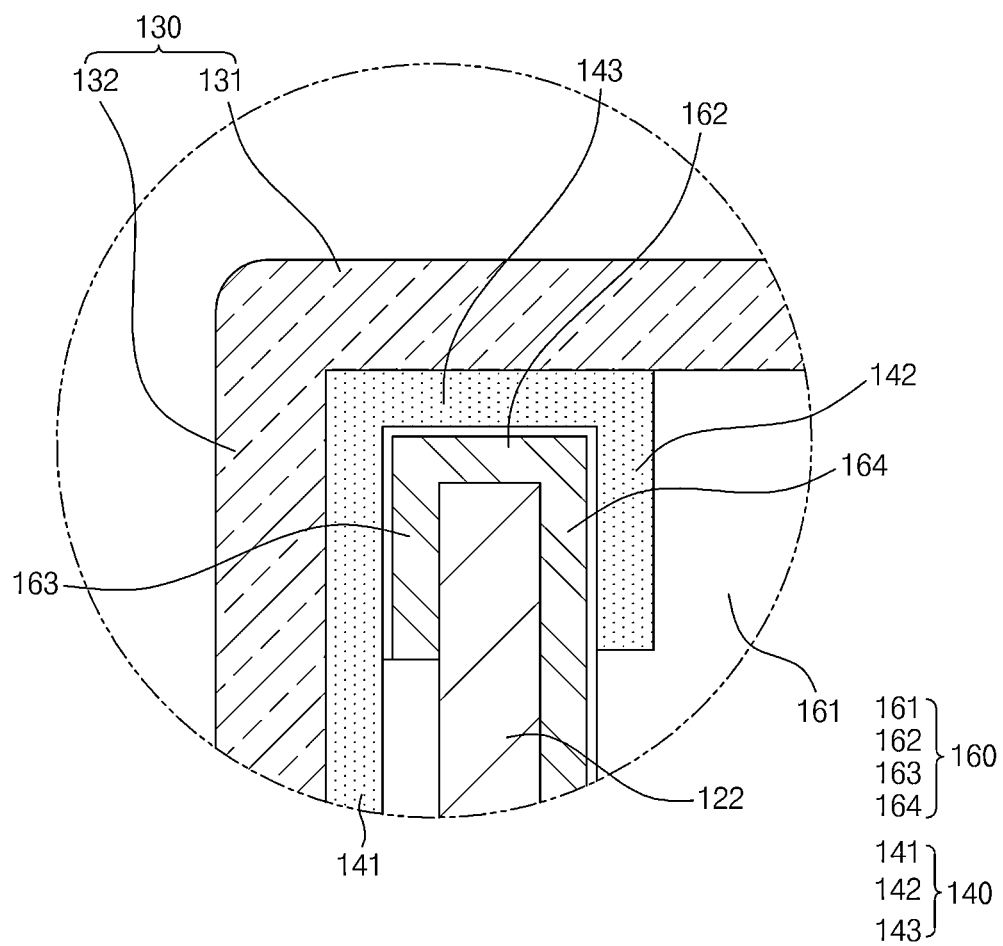
FIG. 8 is a partial enlarged view of FIG. 7.

As illustrated in FIGS. 7 and 8, a button-type secondary battery 100 according to a third embodiment of the present invention comprises an electrode assembly 110, a lower can 120 having an accommodation space, in which the electrode assembly 110 is accommodated, an upper can 130 coupled to the lower can 120 to finish the accommodation space, a gasket 140 sealing a gap between the lower can 120 and the upper can 130 and insulating the lower can 120 and the upper can 130 from each other while being inserted into a coupled portion of the lower can 120 and the upper can 130, and a second electrode tab 160 connecting a second electrode of the electrode assembly to the lower can 120.

That is, the second electrode tab 160 comprises a second-a coupling part 161 coupled to the second electrode of the electrode assembly 110 and a second-b coupling part 162 coupled between the gasket 140, which is disposed at the coupled portion of the lower can 120 and the upper can 130, and the lower can 120.

Particularly, the second-b coupling part 162 is coupled between the gasket 140 and the lower can 120 by a pressure generated when the lower can 120 and the upper can 130 are coupled to each other, and thus, the second electrode tab 160 and the lower can 120 may be coupled to each other without welding.

The second electrode tab 160 further comprises a second-c coupling part 163 coupled between a wall surface 122 and an outer surface 141 while extending from the second-b coupling part 162, and thus, coupling force between the second electrode tab 160 and the lower can 120 may increase through the second-c coupling part 163.

The second electrode tab 160 further comprises a second-d coupling part 164 provided between the second-a coupling part 161 and the second-b coupling part 162 and provided between the wall surface 122 and an inner surface 142 of the gasket 140. The coupling force between the second electrode tab 160 and the lower can 120 may increase through the second-d coupling part 164.

The second electrode tab has the same configuration and function as the second electrode tab described in the button-type secondary battery according to the second embodiment, and thus a detailed description thereof will be omitted.

Therefore, in the button-type secondary battery 100 according to the third embodiment of the present invention, the second electrode tab and the lower can may be coupled to each other without the welding.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Secondary battery
110: Electrode assembly
120: Lower can
121: Bottom surface
122: Wall surface
130: Upper can
131: Cover surface
132: Coupling surface 140: Gasket
141: Outer surface
142: Inner surface
143: Connection surface
150: First electrode tab
151: First-a coupling part
152: First-b coupling part
153: First-c coupling part
154: Extension part
155: First-d coupling part
156:
157: Insulator
158: Cover tape
160: Second electrode tab
161: Second-a coupling part
162: Second-b coupling part
163: Second-c coupling part
164: Second-d coupling part
165: Cover tape
170: Insulating tape

The invention claimed is:

1. A button-type secondary battery, comprising:
an electrode assembly;
a lower can having an accommodation space in which the electrode assembly is accommodated;
an upper can coupled to the lower can to cover the accommodation space;
a gasket configured to seal a gap between the lower can and the upper can and to electrically insulate the lower can from the upper can while being inserted into a coupled portion of the lower can and the upper can;
a first electrode tab including a first coupling part coupled to a first electrode of the electrode assembly and a second coupling part coupled between the gasket, which is disposed at the coupled portion of the lower can and the upper can, and the upper can; and
a second electrode tab coupled to a second electrode of the electrode assembly,
wherein:
the second coupling part is coupled between the gasket and the upper can by a pressure generated when the lower can and the upper can are coupled to each other; and
at least a portion of the first electrode tab and at least a portion of the second electrode tab overlap each other along a longitudinal direction of the button-type secondary battery.

2. The button-type secondary battery of claim 1, wherein the lower can comprises a bottom surface on which the electrode assembly is disposed, and a wall surface formed along an edge of the bottom surface to form the accommodation space,
wherein the upper can comprises a cover surface configured to cover the accommodation space and a coupling surface formed along an edge of the cover surface and coupled to the wall surface,
wherein the gasket comprises an outer surface provided between the wall surface and the coupling surface, an inner surface provided inside the wall surface, and a connection surface provided between the wall surface and the cover surface to connect the outer surface to the inner surface, and
wherein the second coupling part is coupled between the connection surface and the cover surface.

3. The button-type secondary battery of claim 2, wherein the first electrode tab further comprises a third coupling part coupled between the coupling surface and the outer surface while extending from the second coupling part,
wherein the third coupling part is coupled between the coupling surface and the outer surface by a pressure generated when the wall surface and the coupling surface are coupled to each other.

4. The button-type secondary battery of claim 2, wherein the first electrode tab further comprises an extension part provided between the first coupling part and the second coupling part to extend along a surface of the electrode assembly, and a fourth coupling part provided between the extension part and the second coupling part and bent to be in surface close contact with the inner surface disposed on the wall surface.

5. The button-type secondary battery of claim 4, wherein an insulator having insulation is disposed between the extension part and the surface of the electrode assembly.

6. The button-type secondary battery of claim 2, wherein an insulating tape is attached to the first coupling part corresponding to the wall surface.

7. The button-type secondary battery of claim 2, wherein the second electrode tab connects the second electrode to the lower can.

8. The button-type secondary battery of claim 7, wherein the second electrode tab comprises a fifth coupling part coupled to the second electrode of the electrode assembly and a sixth coupling part coupled between the gasket, which is disposed at the coupled portion of the lower can and the upper can, and the lower can,
wherein the sixth coupling part is coupled between the gasket and the lower can by the pressure generated when the lower can and the upper can are coupled to each other.

9. The button-type secondary battery of claim 8, wherein the second electrode tab further comprises seventh coupling part coupled between the wall surface and the outer surface while extending from the second b-sixth coupling part,
wherein the seventh coupling part is coupled between the wall surface and the outer surface by a pressure generated when the wall surface and the coupling surface are coupled to each other.

10. The button-type secondary battery of claim 9, wherein the second electrode tab further comprises an eighth coupling part provided between the fifth coupling part and the seventh coupling part and provided between the wall surface and the inner surface.

11. A button-type secondary battery, comprising:
an electrode assembly;
a lower can having an accommodation space in which the electrode assembly is accommodated;
an upper can coupled to the lower can to cover the accommodation space;
a gasket configured to seal a gap between the lower can and the upper can and to electrically insulate the lower can from the upper can while being inserted into a coupled portion of the lower can and the upper can;
a first electrode tab coupled to a first electrode of the electrode assembly; and
a second electrode tab including a first coupling part coupled to a second electrode of the electrode assembly and a second coupling part coupled between the gasket, which is disposed at the coupled portion of the lower can and the upper can, and the lower can,
wherein:

the second coupling part is coupled between the gasket and the lower can by a pressure generated when the lower can and the upper can are coupled to each other; and at least a portion of the first electrode tab and at least a portion of the second electrode tab overlap each other along a longitudinal direction of the button-type secondary battery.

12. The button-type secondary battery of claim 11, wherein the first electrode tab is configured to connect the first electrode of the electrode assembly to the upper can, wherein the first electrode tab comprises a third coupling part coupled to the first electrode of the electrode assembly and a fourth coupling part coupled between the gasket, which is disposed at the coupled portion of the lower can and the upper can, and the upper can, and wherein the fourth coupling part is coupled between the gasket and the upper can by the pressure generated when the lower can and the upper can are coupled to each other.

13. The button-type secondary battery of claim 1, wherein:

the upper can comprises a cover surface configured to cover the accommodation space;

the lower can comprises a bottom surface on which the electrode assembly is disposed;

the cover surface and the bottom surface are spaced spart along a vertical direction of the button-type secondary battery;

the at least a portion of the first electrode tab is disposed between the cover surface of the upper can and the electrode assembly; and the at least a portion of the second electrode tab is disposed between the electrode assembly and the bottom surface of the lower can.

14. A button-type secondary battery, comprising:

an electrode assembly;

a lower can having an accommodation space in which the electrode assembly is accommodated;

an upper can coupled to the lower can to cover the accommodation space;

a gasket configured to seal a gap between the lower can and the upper can and to electrically insulate the lower can from the upper can while being inserted into a coupled portion of the lower can and the upper can;

a first electrode tab including a first coupling part coupled to a first electrode of the electrode assembly and a second coupling part coupled between the gasket, which is disposed at the coupled portion of the lower can and the upper can, and the upper can; and a second electrode tab coupled to a second electrode of the electrode assembly, wherein:

the second coupling part is coupled between the gasket and the upper can by a pressure generated when the lower can and the upper can are coupled to each other;

at least a portion of the first electrode tab is disposed at a first side of the electrode assembly;

at least a portion of the second electrode tab is disposed at a second side of the electrode assembly; and the second side is opposite to the first side along a vertical direction of the button-type secondary battery.

* * * * *